(12) United States Patent
Wu

(10) Patent No.: US 9,301,893 B1
(45) Date of Patent: Apr. 5, 2016

(54) FOLDABLE SCOOTER FRAME

(71) Applicant: ENERGY CONTROL LIMITED, Tortola (VG)

(72) Inventor: Donald P. H. Wu, Hsinchu County (TW)

(73) Assignee: ENERGY CONTROL LIMITED, Tortola (VG)

( * ) Notice: Subject to any disclaimer, the term of this patent is extended or adjusted under 35 U.S.C. 154(b) by 31 days.

(21) Appl. No.: 14/733,523

(22) Filed: Jun. 8, 2015

(51) Int. Cl.
*A61G 5/08* (2006.01)
*B62K 5/007* (2013.01)

(52) U.S. Cl.
CPC . *A61G 5/08* (2013.01); *B62K 5/007* (2013.01); *A61G 2005/085* (2013.01); *A61G 2005/0841* (2013.01); *A61G 2005/0866* (2013.01)

(58) Field of Classification Search
CPC ............ A61G 5/08; A61G 2005/0808; A61G 2005/0833; A61G 2005/0841; A61G 2005/0866; B62K 5/003; B62K 5/023; B62K 5/025; B62K 5/007
See application file for complete search history.

(56) References Cited

U.S. PATENT DOCUMENTS

| 5,036,938 A | * | 8/1991 | Blount | B62D 61/08 180/208 |
| 2003/0141121 A1 | * | 7/2003 | Flowers | A61G 5/045 180/65.1 |
| 2005/0077097 A1 | * | 4/2005 | Kosco | B62K 5/025 180/208 |

* cited by examiner

*Primary Examiner* — Bryan Evans
(74) *Attorney, Agent, or Firm* — Wang Law Firm, Inc.; Li K. Wang; Stephen Hsu

(57) ABSTRACT

A foldable scooter frame includes: a front fork pivoted to a front frame, a front wheel assembly disposed on the front fork, the front fork being fixed to a pivot seat of a control unit, the pivot seat being pivoted to a control rod, a rear frame being connected to the front frame in a foldable manner, a rear wheel assembly disposed on the rear frame. With the pivoting arrangement of the front and rear frames, and more importantly, with the bridge rod abutted against the rear frame, the foldable scooter frame of the present invention can be maintained in a best stable state when in use, and when folded, the distance between the front and rear wheel assemblies can be reduced to the least possible amount, and the whole structure is simply structured and can be easily folded without requiring the use of complicated linkage mechanism.

3 Claims, 13 Drawing Sheets

FOLDABLE SCOOTER FRAME

BACKGROUND OF THE INVENTION

1. Field of the Invention

The present invention relates to a foldable frame; and more particularly to a foldable scooter frame.

2. Description of the Prior Art

The electric scooter as a transportation for disabilities is usually used in a specific area. However, sometimes the electric scooter needs to be moved to and used in a different location, and an easy-to-carry scooter would be preferable.

A scooter A with foldable handlebar A1 as shown in FIG. 1 would fit the requirement, the foldable handlebar A1 is provided with a folding device A2 which allows to the handlebar A1 to be folded into a compact size, when the scooter A is not in use.

FIG. 2 shows that another foldable electric scooter B is provided with a foldable device B3 which is located between the seat portion B1 and the seat back B2 to enable the seat portion B1 and the seat back B2 to be folded toward each other.

FIGS. 3A and 3B shows that another foldable electric scooter C is provided with a front frame C1 and a rear frame C2 which are pivoted to each other by a four-bar linkage mechanism. However, the four-bar linkage mechanism is complicated in structure and is unstable in quality.

The present invention has arisen to mitigate and/or obviate the afore-described disadvantages.

SUMMARY OF THE INVENTION

The primary objective of the present invention is to provide a foldable scooter frame which is stable and easy to fold.

To achieve the above objective, a foldable scooter frame in accordance with the present invention comprises: a front fork pivoted to a front frame, a front wheel assembly disposed on the front fork, the front fork being fixed to a pivot seat of a control unit, the pivot seat being pivoted to a control rod, a rear frame being connected to the front frame in a foldable manner, a rear wheel assembly disposed on the rear frame; the foldable scooter frame being characterized in that:

the front frame includes a front frame body and a bridge rod, the front frame body includes two front lateral portions and a front end portion, the two front lateral portions are spaced apart and in parallel to each other, the front end portion is connected between the two front lateral portions to form a U-shaped structure and located at a first end of each of the two front lateral portions, the bridge rod is connected between the two front lateral portions and located at a second end of each of the two front lateral portions, on the bridge rod are disposed two opposite assembling surfaces;

the control rod is able to pivot toward the front frame;

the rear frame includes two rear lateral portions which are spaced apart and in parallel to each other, the two rear lateral portions of the rear frame are inserted between the two front lateral portions, each of the two front lateral portions is pivotally to a corresponding one of the two rear lateral portions by a frame pivot, when the two front lateral portions are located at the same level as the two rear lateral portions, the rear wheel assembly and the frame pivot are disposed at two opposite sides of the bridge rod, and the bridge rod is abutted against the two rear lateral portions, the rear wheel assembly rotates around a rear wheel axis, a distance from the rear wheel axis to the frame pivots is defined as a rear wheelbase L, a distance from a center of a width of the bridge rod to the frame pivots is defined as a setting distance L', and L'≤½*L; and the seat assembly includes a seat post and a seat, the seat post has one end pivotally disposed between the two assembling surfaces, and has another end pivoted to the seat, so that the seat is able to pivot towards a side of the seat post close to the rear wheel assembly.

With the pivoting arrangement of the front and rear frames, and more importantly, with the bridge rod abutted against the rear frame, the foldable scooter frame of the present invention can be maintained in a best stable state when in use, and when folded, the distance between the front and rear wheel assemblies can be reduced to the least possible amount, and the whole structure is simply structured and can be easily folded without requiring the use of complicated linkage mechanism.

DETAILED DESCRIPTION OF THE PREFERRED EMBODIMENTS

Figure 1:
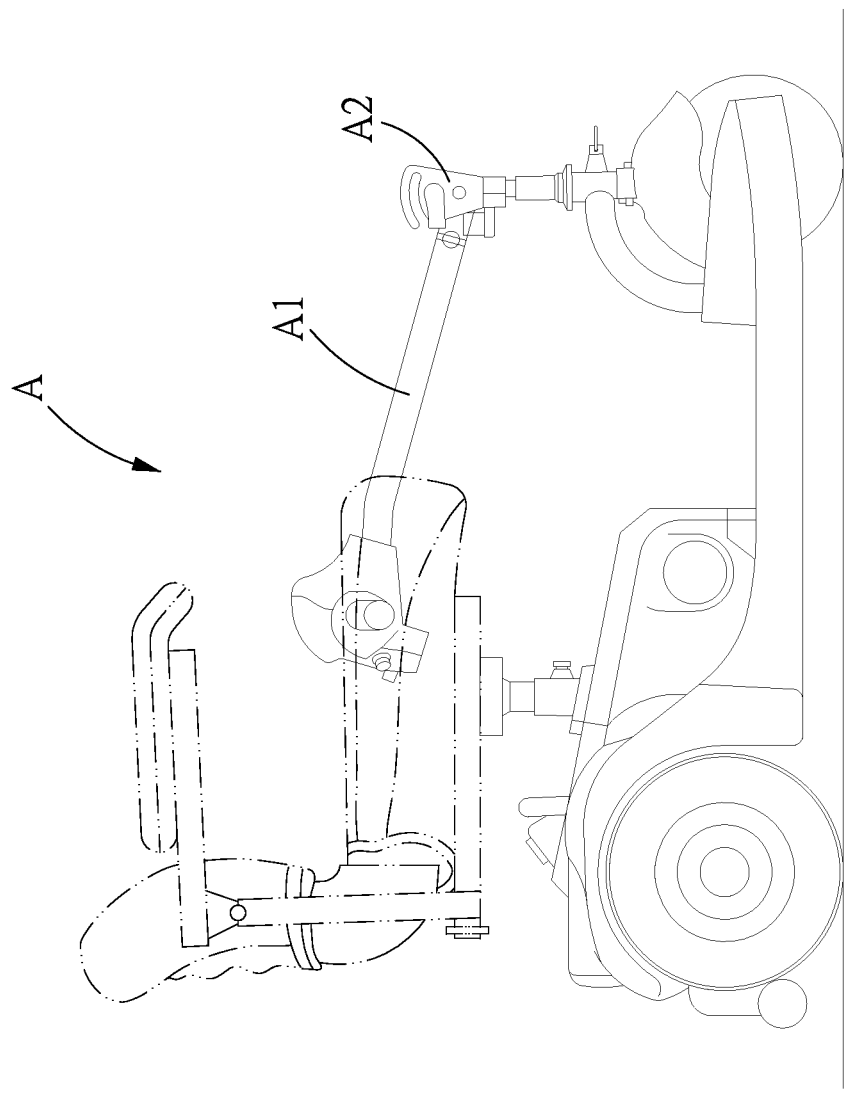
FIG. 1 is a perspective view of a conventional foldable electric scooter.
Figure 2:
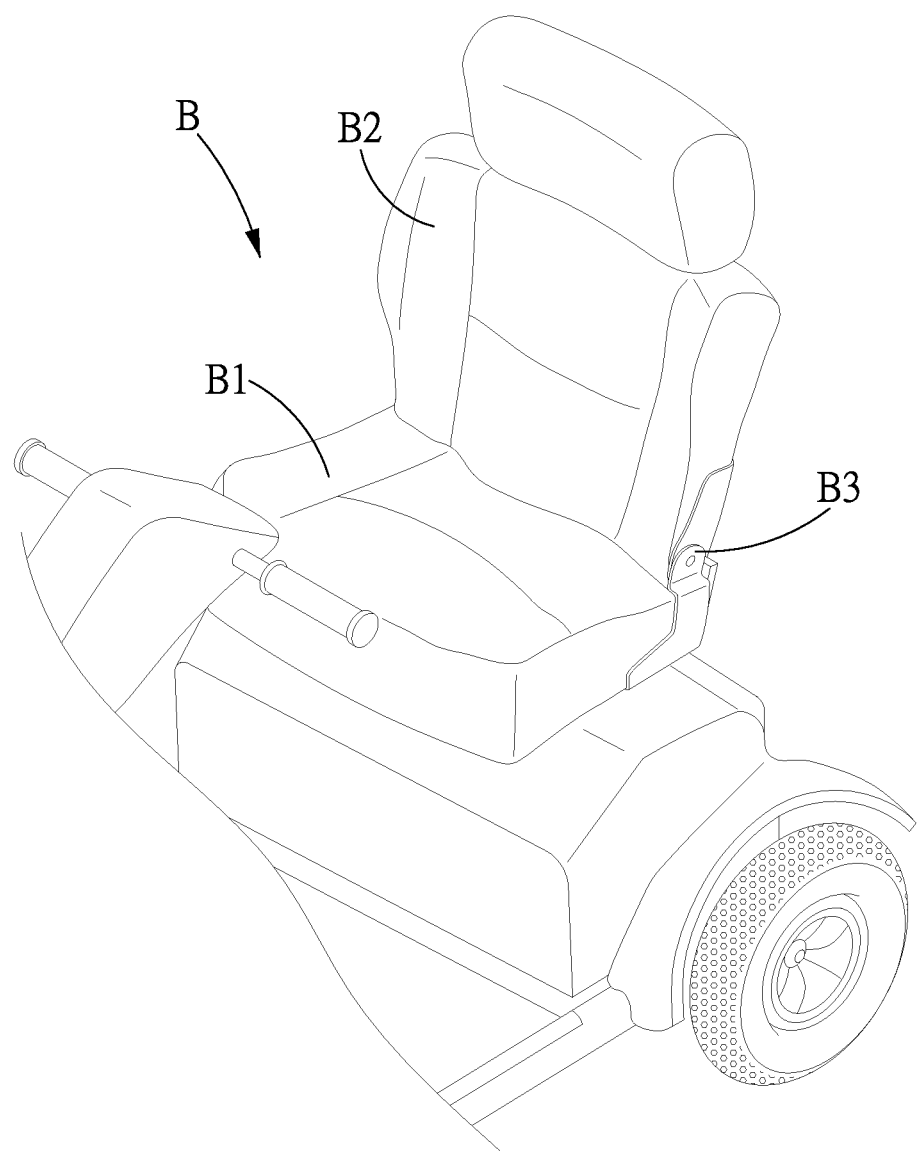
FIG. 2 shows another conventional foldable electric scooter.
Figure 3A:
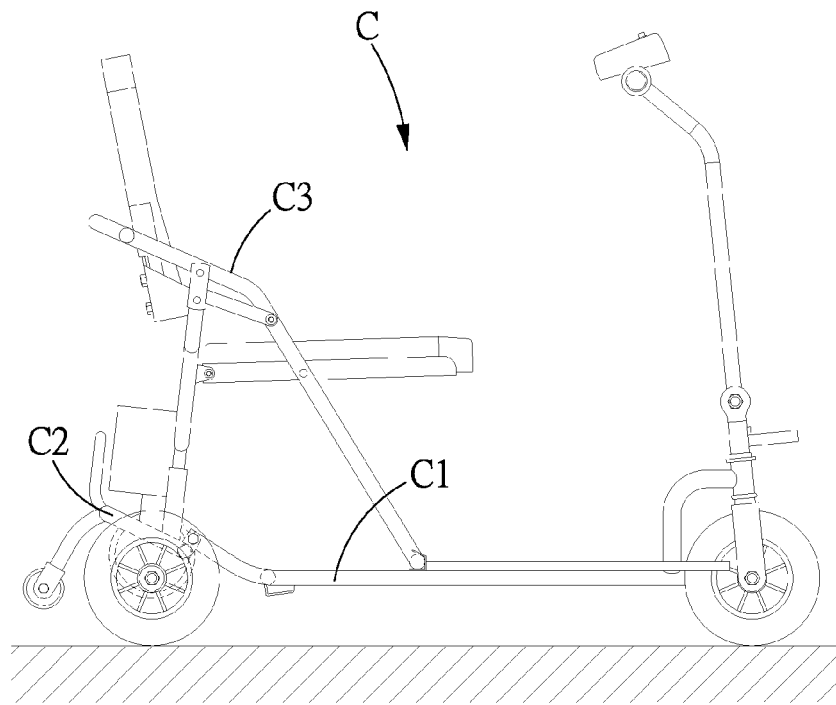
FIG. 3A shows that a conventional electrical scooter is in an unfolded state.
Figure 3B:
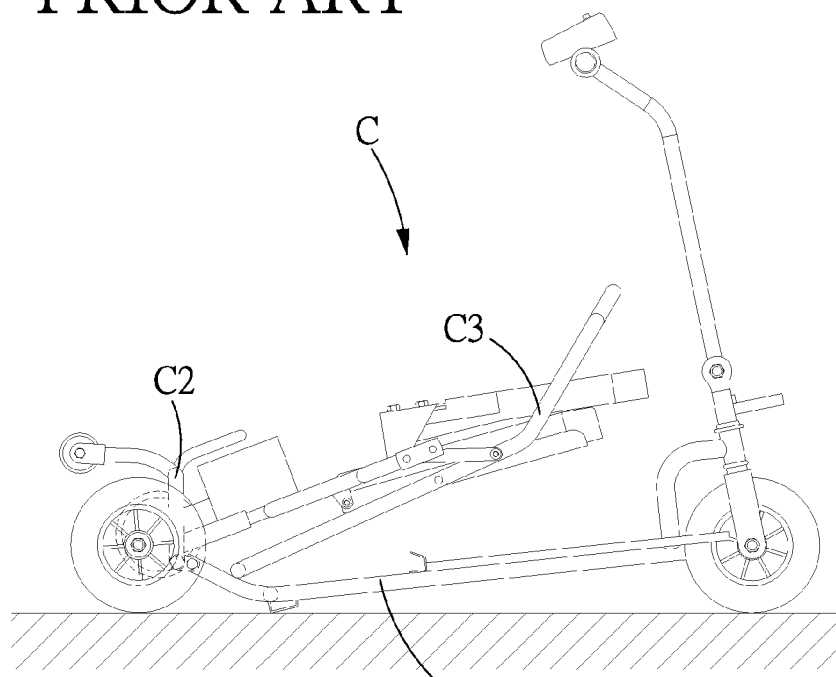
FIG. 3B shows that the conventional electrical scooter is in a folded state.

The present invention will be clearer from the following description when viewed together with the accompanying drawings, which show, for purpose of illustrations only, the preferred embodiment in accordance with the present invention.

Referring to FIGS. 4-13, a foldable scooter frame in accordance with a preferred embodiment of the represent invention comprises: a front fame 10, a front guide unit 20, a rear frame 30, a drive unit 40, a rear wheel assembly 50, and a seat assembly 60.

The front frame 10 includes a front frame body 11 and a bridge rod 12. The front frame body 11 includes two front lateral portions 111, a front end portion 112 and an extending neck portion 113. The two front lateral portions 111 are spaced apart and in parallel to each other. The front end portion 112 is connected between the two front lateral portions 111 to form a U-shaped structure and located at first end of each of the front lateral portions 111. In this embodiment, the front lateral portions 111 and the front end portion 112 are in the form of a pipe with a rectangular cross section. Each of the front lateral portions 111 has a front lateral top surface F11, a front lateral bottom surface F12, and a front lateral outer surface F13 and a front lateral inner surface F14 which are located between the front lateral top and bottom surfaces F11, F12. The front end portion 112 includes a front end top surface F15, a front end bottom surface F16, and a front end outer surface F17 and a front end inner surface F18 which are located between the front end top and bottom surfaces F15, F16. The extending neck portion 113 extends from the front end top surface F15 of the front end portion 112, and has first end connected to the front end portion 112 and has second end formed with a pipe portion 114. The bridge rod 12 is connected between the two front lateral portions 111 and located at the front lateral top surface F11 at second end of each of the front lateral portions 111. On the bridge rod 12 are disposed two opposite assembling surfaces 121.

Figure 4:
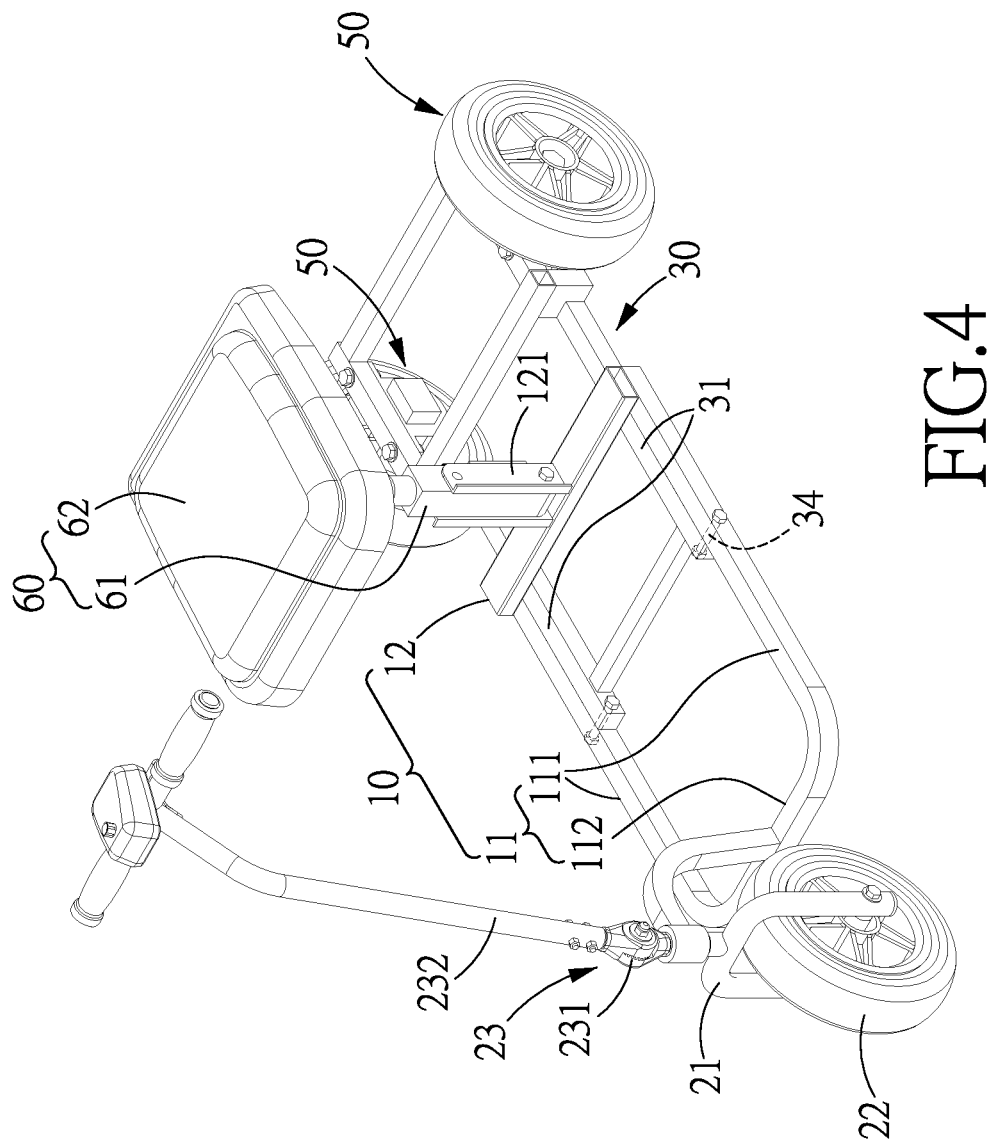
FIG. 4 is a perspective view of a foldable scooter frame in accordance with the present invention.
Figure 5:
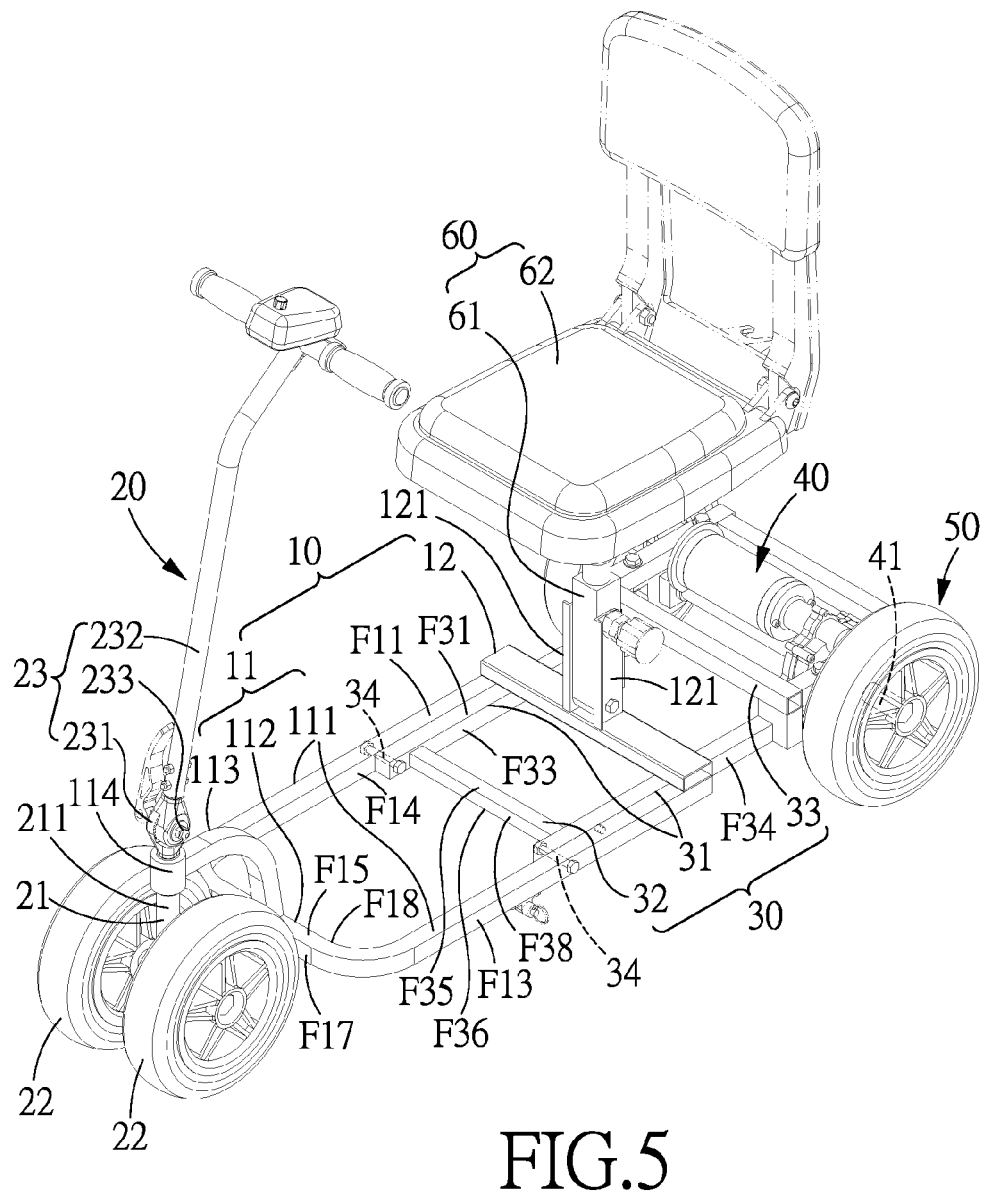
FIG. 5 is another perspective view of the foldable scooter frame in accordance with the present invention.
Figure 6:
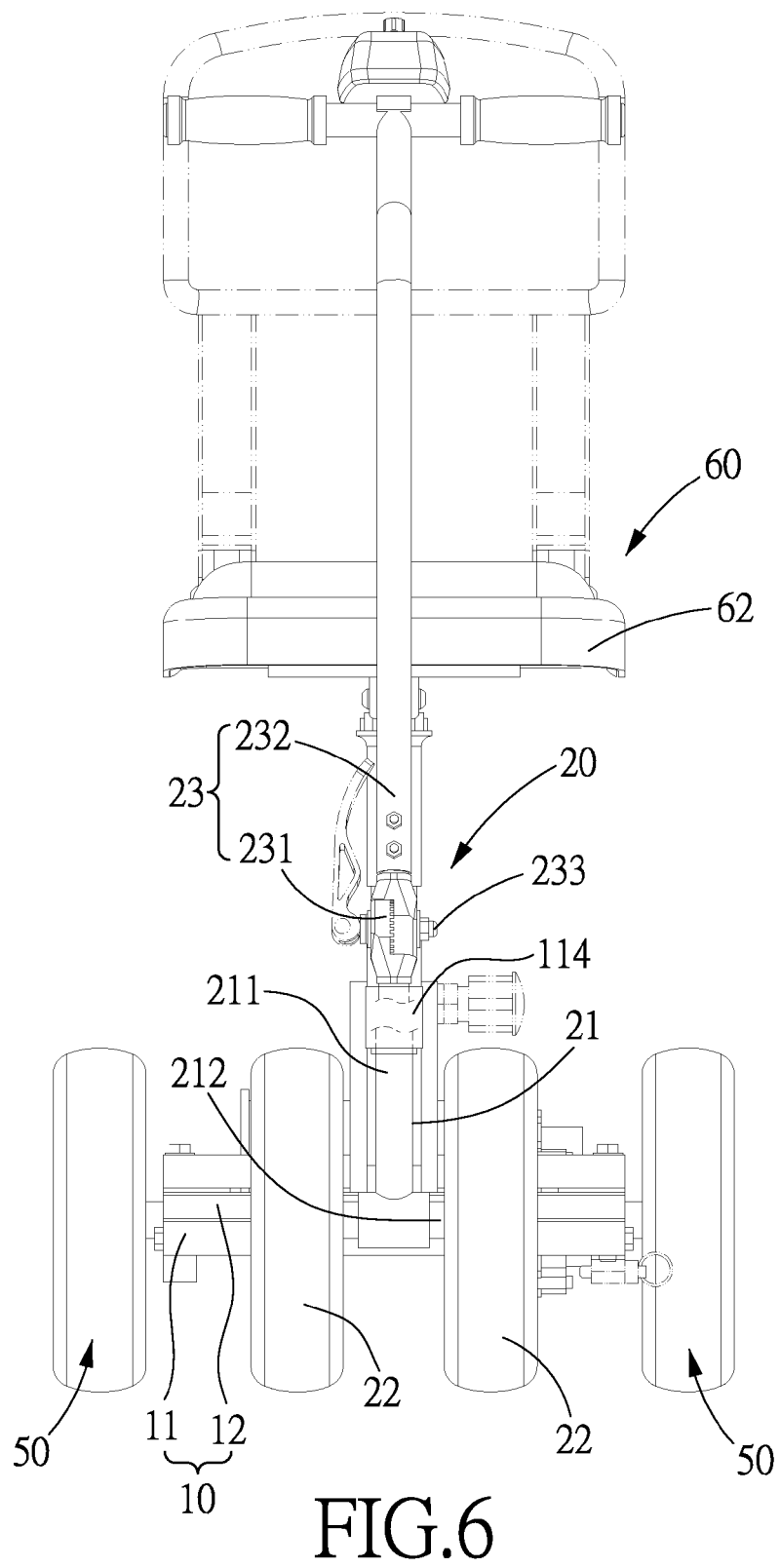
FIG. 6 is a front view of the foldable scooter frame in accordance with the present invention.
Figure 7:
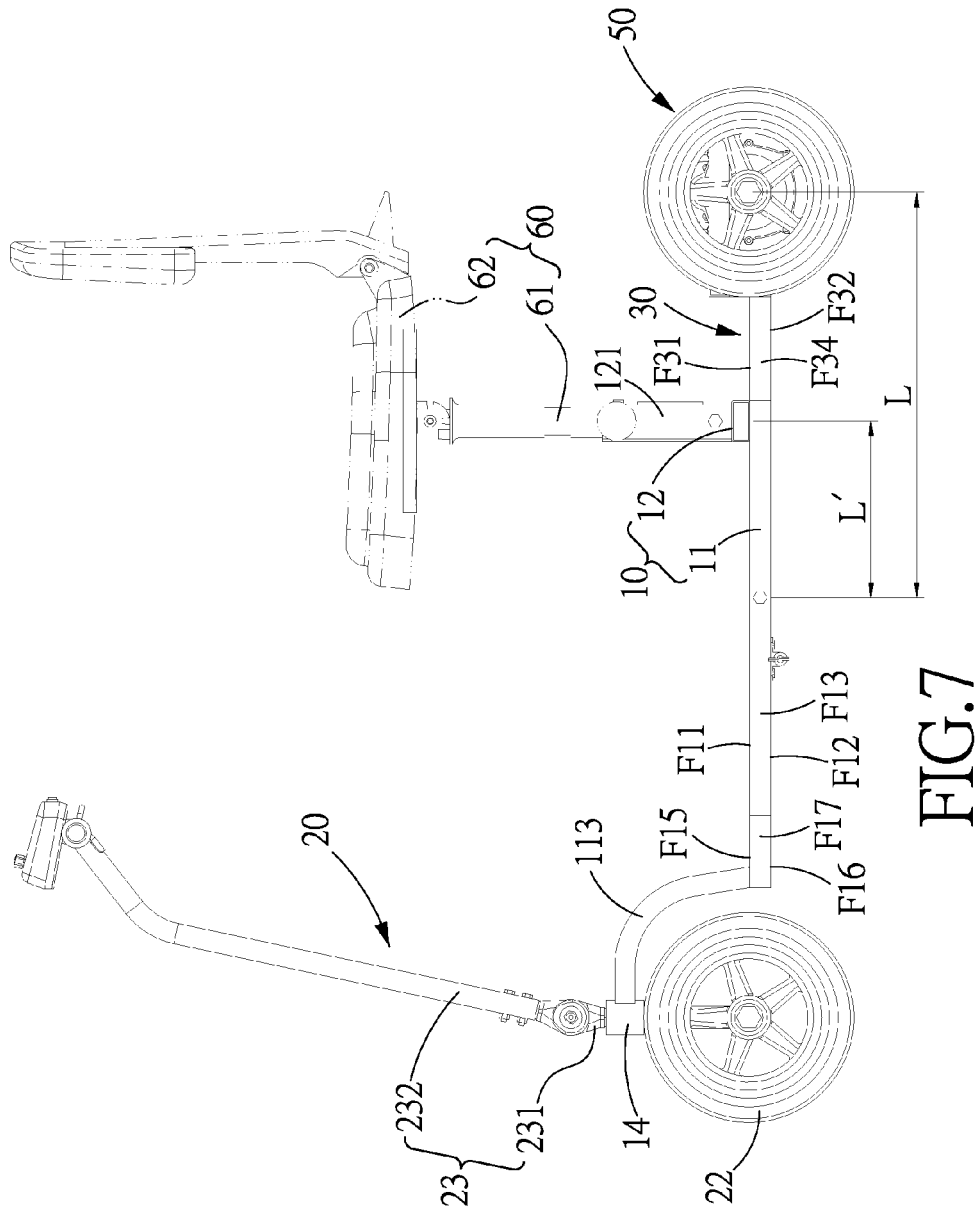
FIG. 7 is a side view of the foldable scooter frame in accordance with the present invention.

The front guide unit 20 includes a front fork 21, a front wheel assembly 22 and a control unit 23. First end of the front fork 21 is an insertion section 211 to be pivotally inserted in the pipe portion 114 of the front frame 10, and second end of the front fork 21 is provided with a wheel shaft 212. The front wheel assembly 22 is rotatably mounted on the wheel shaft 212. The control unit 23 is connected to the insertion section 211 so as to drive the front fork 21 to rotate. The control unit 23 further includes a pivot seat 231 and a control rod 232. The pivot seat 231 has first end pivotally inserted through the pipe portion 114 and connected to the insertion section 211, and second end of the pivot seat 231 is pivotally connected to first end of the control rod 232 by a pivot 233, so that the control rod 232 is rotatable about the pivot 233. The pivot 233 extends in a direction different from a direction in which the insertion section 211 extends. In this embodiment, the pivot 233 extends in a direction perpendicular to a direction in which the insertion section 211 extends, so that the control rod 232 is able to pivot towards the front frame 10. As shown in FIGS. 5-13, the front wheel assembly 22 includes two front wheels, but the quantity of the front wheels is not limited to two, and a single front wheel can also constitute the front guide unit 20 (as shown in FIG. 4).

The rear frame 30 includes two rear lateral portions 31, a middle portion 32 and a rear frame body 33. The two rear lateral portions 31 are spaced apart and in parallel to each other. The middle portion 32 is connected between the two rear lateral portions 31 to form an H-shaped structure and located at first end of each of the two rear lateral portions 31. The rear frame body 33 is fixed to the two rear lateral portions 31 and located at second end of each of the two rear lateral portions 31. In this embodiment, the two rear lateral portions 31 and the middle portion 32 are in the form of a pipe with a rectangular cross section. Each of the two rear lateral portions 31 includes a rear lateral top surface F31, a rear lateral bottom surface F32, and a rear lateral inner surface F33 and a rear lateral outer surface F34 which are located between the rear lateral top and bottom surfaces F31, F32. The middle portion 32 includes a middle top surface F35, a middle bottom surface F36, and a middle inner surface F37 and a middle outer surface F38 which are located between the middle top and bottom surfaces F35, F36. The middle portion 32 is connected between the rear lateral inner surfaces F33 of the two rear lateral portions 31. The two rear lateral portions 31 of the rear frame 30 are inserted between the two front lateral portions 111 and each have the rear lateral outer surface F34 abutted against the front lateral inner surface F14 of each of the front lateral portions 111. Namely, the rear frame 30 is disposed between the two front lateral portions 111 of the front frame 10, and each of the front lateral portions 111 is pivotally to a corresponding one of the two rear lateral portions 31 by a frame pivot 34. When the two front lateral portions 111 are located at the same level as the two rear lateral portions 31, namely, the front lateral top surfaces F11 are located at the same level as the rear lateral top surfaces F31, the bridge rod 12 is abutted against the two rear lateral portions 31. In this embodiment, each of the two frame pivots 34 is located at the first end of the corresponding one of the two rear lateral portions 31 (namely, the end of the two rear lateral portions 31 that is located further away from the rear frame body 33 than the another end).

The drive unit 40 is fixed on the rear frame body 33 and includes a drive shaft 41.

The rear wheel assembly 50 includes two rear wheels in this embodiment, and the rear wheels are rotatably disposed at two sides of the rear frame body 33. At least one of the rear wheels is connected to and driven to rotate by the drive shaft 41. When the front lateral portions 111 are located at the same level with the two rear lateral portions 31, the rear wheel assembly 50 and the frame pivot 34 are disposed at two opposite sides of the bridge rod 12. In this embodiment, the rear wheel assembly 50 includes two rear wheels, but the quantity of the rear wheels is not limited to two, and a single rear wheel can also constitute the rear wheel assembly 50.

The seat assembly 60 includes a seat post 61 and a seat 62. The seat post 61 has one end pivotally disposed between the two assembling surfaces 121, and another end pivoted to the seat 62, so that the seat 62 is able to pivot towards the side of the seat post 61 close to the rear wheel assembly 50. The rear wheel assembly 50 rotates around a rear wheel axis, and a distance from the rear wheel axis to the frame pivots 34 is defined as a rear wheelbase L, a distance from the center of a width of the bridge rod 12 to the frame pivots 34 is defined as a setting distance L', and L'≤½*L. since the seat assembly 60 is disposed between the two assembling surfaces 121, and L'≤½*L, so that the seat assembly 60 can be maintained at a distance from the rear wheel assembly 50, and the center of gravity of the driver sitting on the seat assembly 60 won't be too close to the rear wheel assembly 50 and cause tilting or overturning of the scooter, thus improving drive safety.

FIGS. 4-10 shows that the foldable scooter frame is in a unfolded or spread-out state, in which, the bridge rod 12 of the front frame 10 is abutted against the rear lateral top surface F31 of the rear lateral portions 31 of the rear frame 30, so that the front frame 10 can be stably abutted against the rear frame 30. Since the bridge rod 12 is located on the front lateral top surface F11 of the front frame 10, and when the bridge rod 12 is abutted against the two rear lateral portions 31, the front lateral top surface F11 and the rear lateral top surface F31 are located at the same level, which makes the structure more stable.

It is to be noted that the front and rear frames 10, 30 are able to pivot to each other because of the frame pivots 34. When the front and rear frames 10, 30 are in a spread-out state, the downward pivoting freedom of the front frame 10 will be restricted by the front wheel assembly 22 pressing against the ground. Meanwhile, the bridge rod 12 of the front frame 10 is abutted against the rear frame 30 to prevent the downward movement of the bridge rod 12, which consequently prevents the upward pivoting of the front wheel assembly 22, so as to ensure that the front frame 10 is maintained in a stable manner.

Similarly, the downward pivoting freedom of the rear frame 30 is restricted by the rear wheel assembly 50 pressing against the ground. Meanwhile, the rear frame 30 is pressed by the bridge rod 12 prevent upward pivoting of the rear frame 30, which consequently ensures that the rear frame 30 is maintained in a stable manner.

Figure 8:
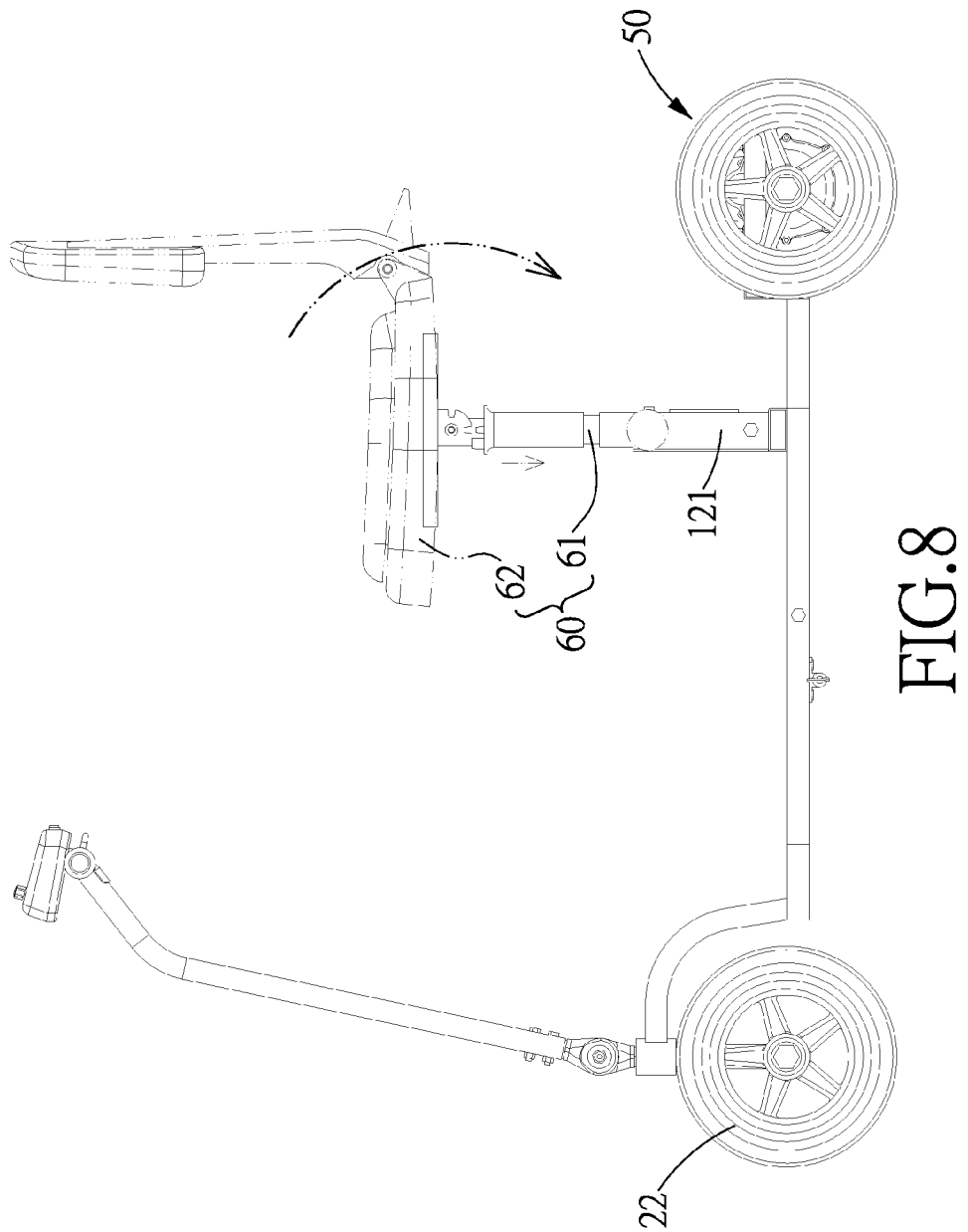
FIG. 8 is an illustrative view of the present invention showing that the seat is being folded.
Figure 9:
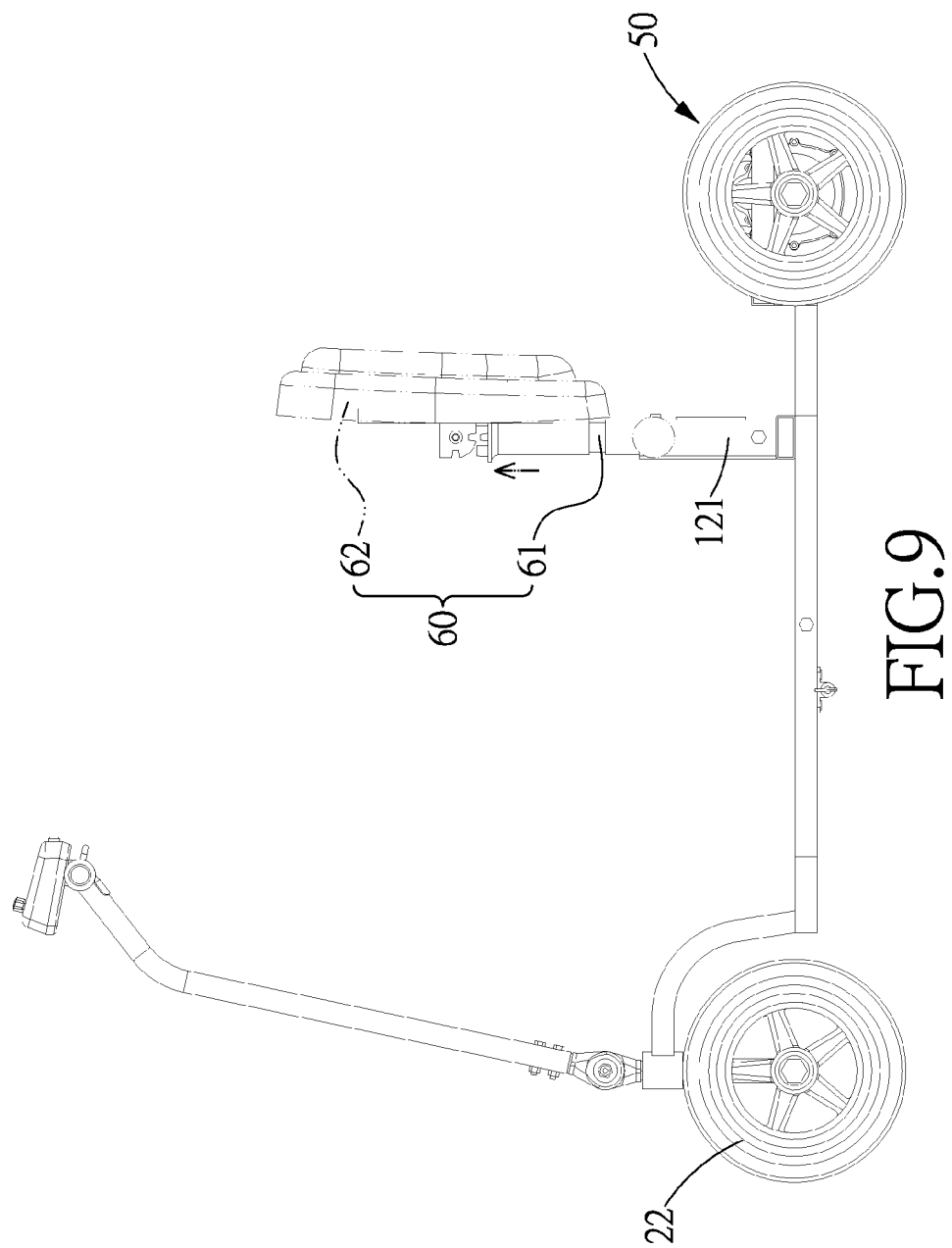
FIG. 9 is a continued view of FIG. 8.
Figure 10:
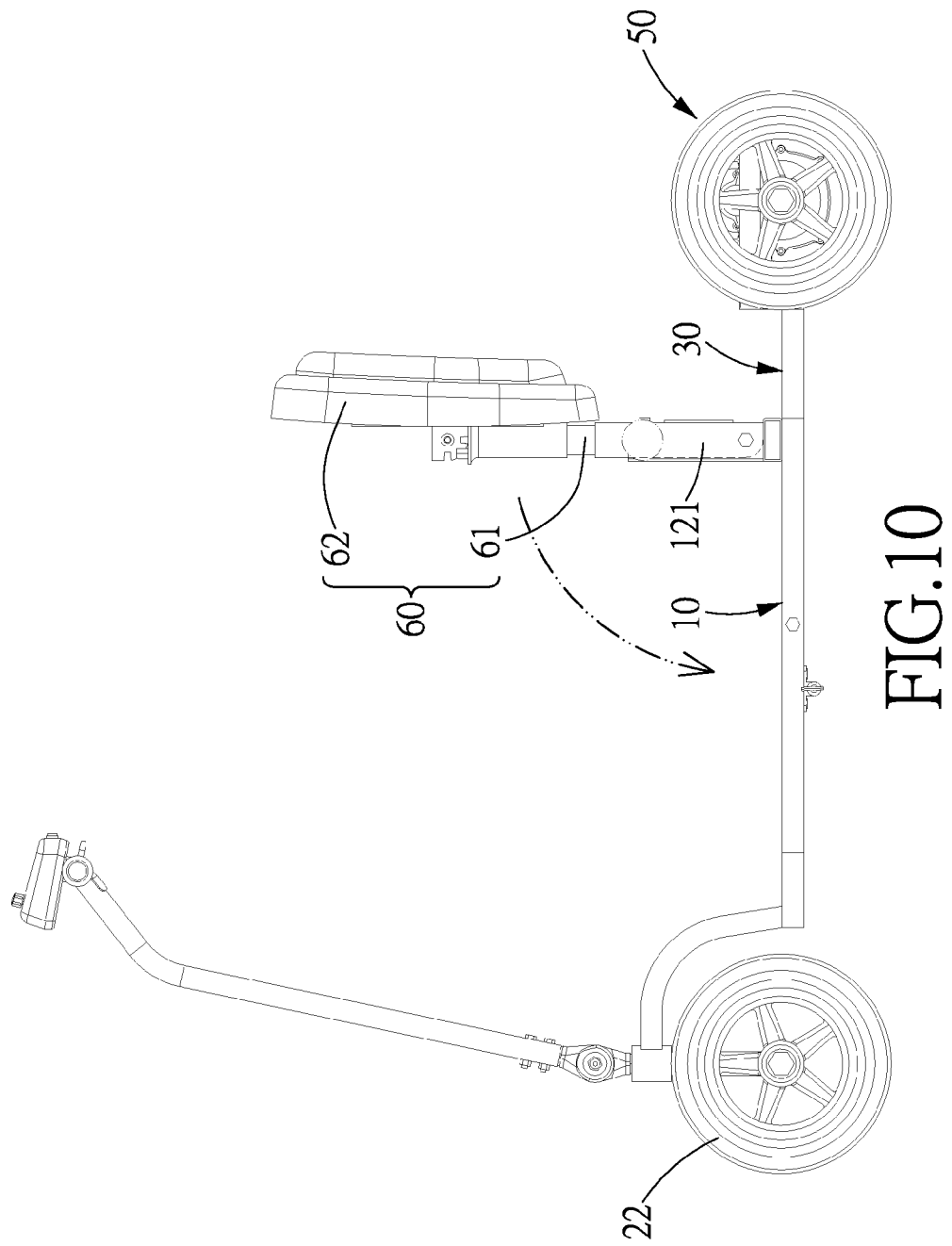
FIG. 10 is an illustrative view of the present invention showing that the seat post is being folded.
Figure 11:
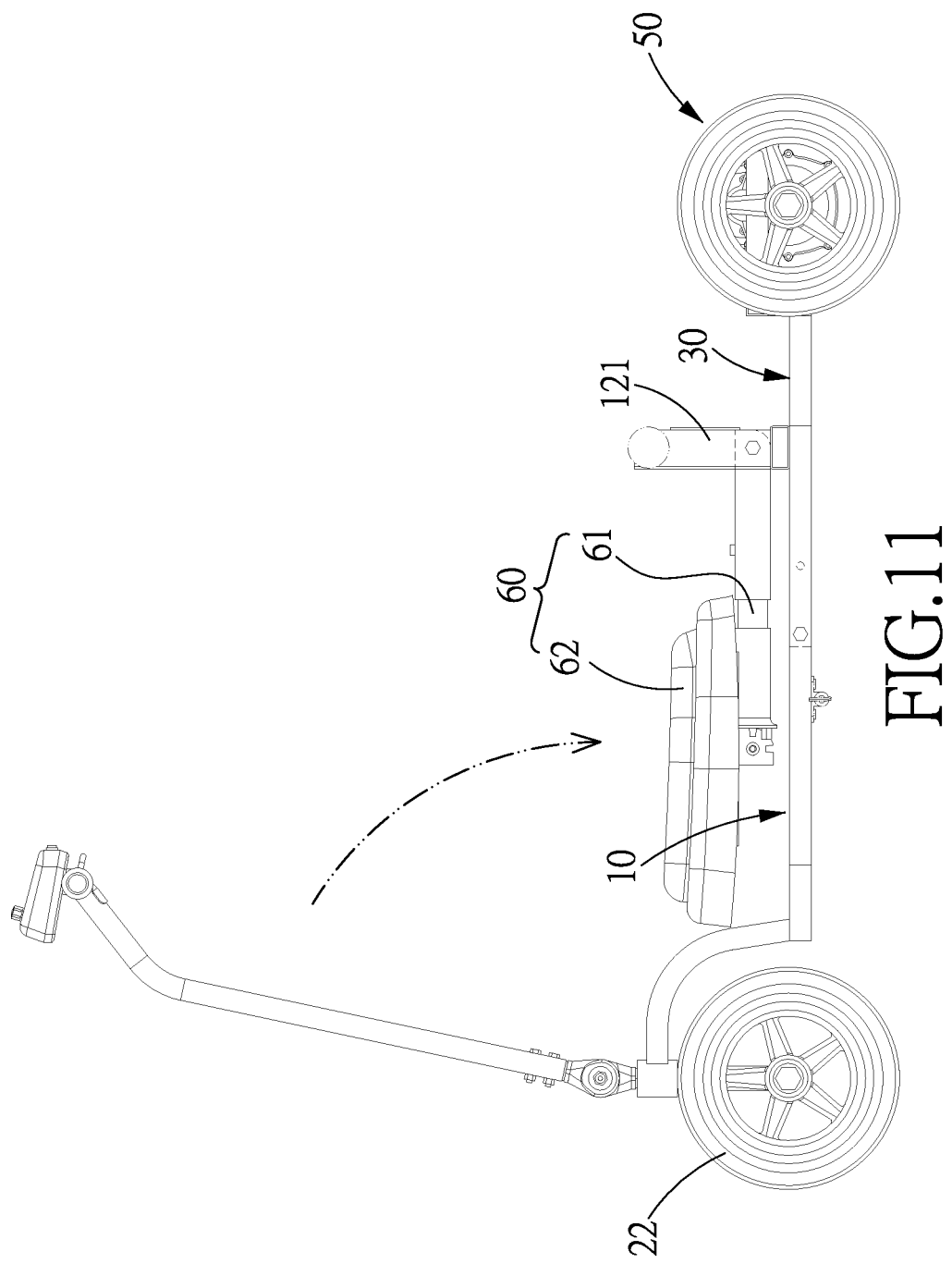
FIG. 11 is a continued view of FIG. 10.

To fold the foldable scooter frame, as shown in FIGS. 8 and 9, the seat 62 can be pulled to make the seat 62 pivot towards the seat post 61 until the seat 62 is abutted against the surface of the seat post 61 close to the rear wheel assembly 50. Then the seat post 61 is pulled to pivot with respect to the assembling surface 121, and the seat post 61 pivots towards the front wheel assembly 22 until it is abutted against the front frame 10, as shown in FIGS. 10 and 11.

Figure 12:
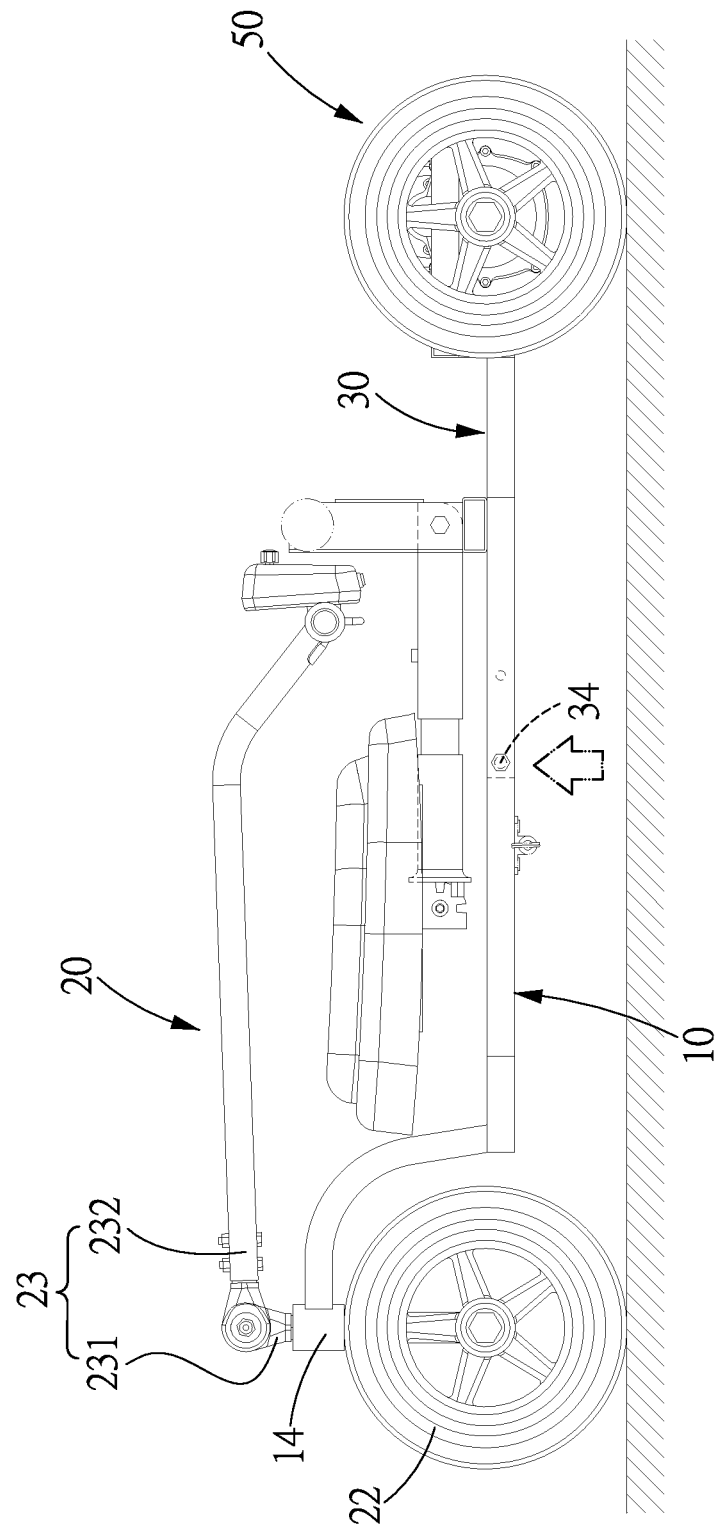
FIG. 12 shows that the control rod of the present invention is being folded.

Then, the control rod 232 of the front guide unit 20 is pulled to pivot with respect to the pivot seat 231 until it is abutted against the front frame 10, as shown in FIG. 12, at this moment, the scooter frame is folded against the front and rear frames 10, 30 into a flat structure.

Figure 13:
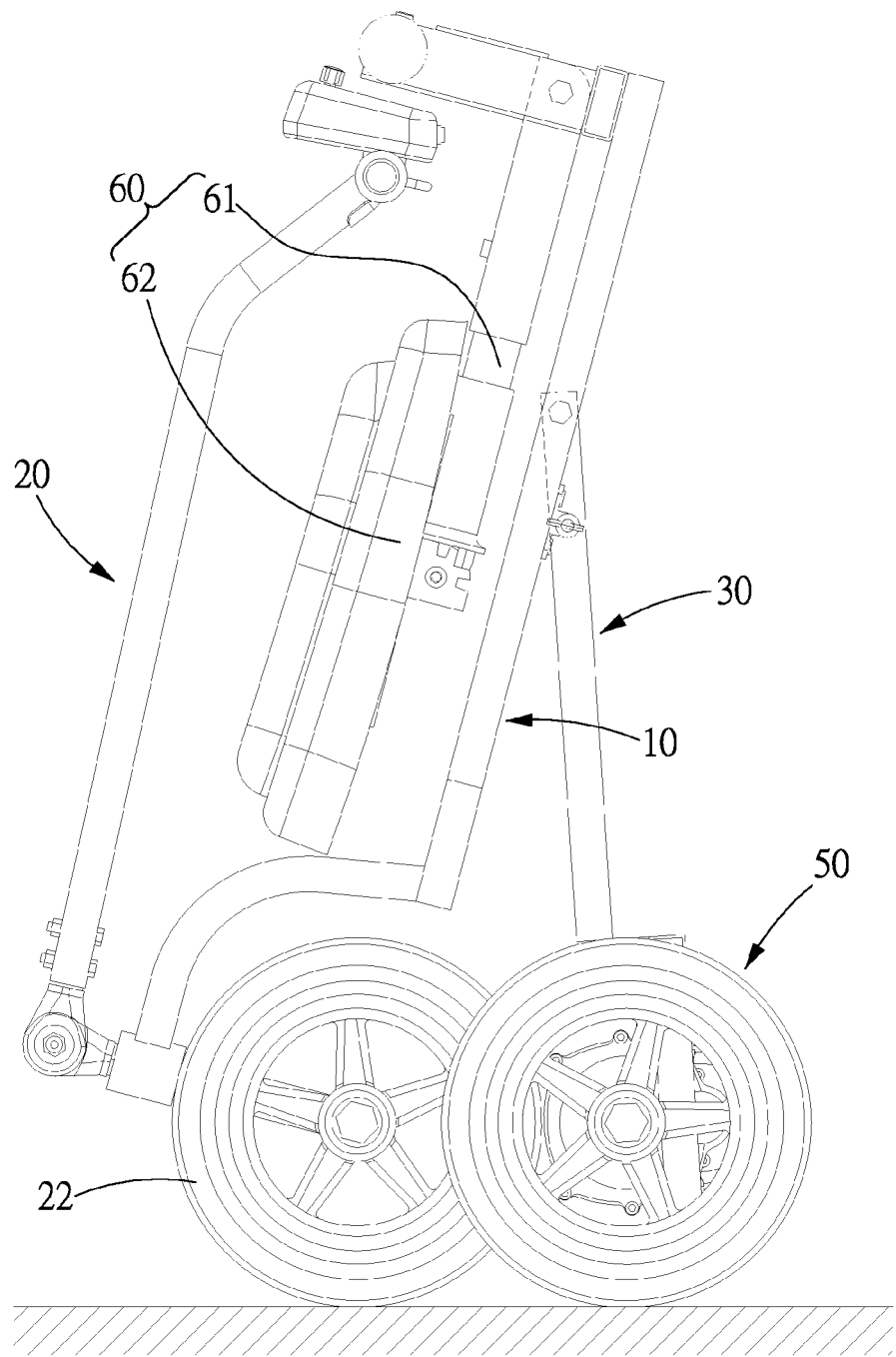
FIG. 13 shows that the scooter frame of the present invention has been folded.

Then, the front and rear frames 10, 30 pivot around the frame pivots 34 to make the front and rear wheel assemblies 22, 50 move close to each other until the front lateral portions 111 of the front frame 10 pivot to an acute angle with respect to the two rear lateral portions 31 of the rear frame 30, so that the folding of the foldable scooter frame is finished, as shown in FIG. 13.

With the pivoting arrangement of the front and rear frames 10, 30, and more importantly, with the bridge rod 12 abutted against the rear frame 30, the foldable scooter frame of the present invention can be maintained in a best stable state when in use, and when folded, the distance between the front and rear wheel assemblies 22, 50 can be reduced to the least possible amount, and the whole structure is simply structured and can be easily folded without requiring the use of complicated linkage mechanism.

While we have shown and described various embodiments in accordance with the present invention, it is clear to those skilled in the art that further embodiments may be made without departing from the scope of the present invention.

What is claimed is:

1. A foldable scooter frame comprising: a front fork pivoted to a front frame, a front wheel assembly disposed on the front fork, the front fork being fixed to a pivot seat of a control unit, the pivot seat being pivoted to a control rod, a rear frame being connected to the front frame in a foldable manner, a rear wheel assembly disposed on the rear frame; the foldable scooter frame being characterized in that:

the front frame includes a front frame body and a bridge rod, the front frame body includes two front lateral portions and a front end portion, the two front lateral portions are spaced apart and in parallel to each other, the front end portion is connected between the two front lateral portions to form a U-shaped structure and located at a first end of each of the two front lateral portions, the bridge rod is connected between the two front lateral portions and located at a second end of each of the two front lateral portions, on the bridge rod are disposed two opposite assembling surfaces;

the control rod is able to pivot toward the front frame;

the rear frame includes two rear lateral portions which are spaced apart and in parallel to each other, the two rear lateral portions of the rear frame are inserted between the two front lateral portions, each of the two front lateral portions is pivotally to a corresponding one of the two rear lateral portions by a frame pivot, when the two front lateral portions are located at the same level as the two rear lateral portions, the rear wheel assembly and the frame pivot are disposed at two opposite sides of the bridge rod, and the bridge rod is abutted against the two rear lateral portions, the rear wheel assembly rotates around a rear wheel axis, a distance from the rear wheel axis to the frame pivots is defined as a rear wheelbase L, a distance from a center of a width of the bridge rod to the frame pivots is defined as a setting distance L', and L'≤½*L; and the seat assembly includes a seat post and a seat, the seat post has one end pivotally disposed between the two assembling surfaces, and has another end pivoted to the seat, so that the seat is able to pivot towards a side of the seat post close to the rear wheel assembly.

2. The foldable scooter frame as claimed in claim 1, wherein the two front lateral portions and the front end portion are in the form of a pipe with a rectangular cross section, each of the two front lateral portions has a front lateral top surface, a front lateral bottom surface, and a front lateral outer surface and a front lateral inner surface which are located between the front lateral top and bottom surfaces, the bridge rod is located at the front lateral top surface of each of the two front lateral portions, the two rear lateral portions and the middle portion are in the form of a pipe with a rectangular cross section, each of the two rear lateral portions includes a rear lateral top surface, a rear lateral bottom surface, and a rear lateral inner surface and a rear lateral outer surface which are located between the rear lateral top and bottom surfaces, when the two front lateral portions are located at the same level as the two rear lateral portions, the two rear lateral portions of the rear frame each have the rear lateral outer surface abutted against the front lateral inner surface of each of the two front lateral portions.

3. The foldable scooter frame as claimed in claim 2, wherein the rear frame includes a middle portion and a rear frame body which is connected between the rear lateral inner surfaces of the two rear lateral portions to form an H-shaped structure.

* * * * *